Aug. 22, 1933.   J. MAINLAND   1,923,104
PICK-UP
Filed Oct. 19, 1928   5 Sheets-Sheet 1

Inventor
John Mainland
by Parker + Carter
Attorneys

Aug. 22, 1933.  J. MAINLAND  1,923,104
PICK-UP
Filed Oct. 19, 1928  5 Sheets-Sheet 5

Inventor
John Mainland
by Parker + Carter
Attorneys

Patented Aug. 22, 1933 1,923,104

UNITED STATES PATENT OFFICE 1,923,104

PICK-UP

John Mainland, La Porte, Ind., assignor, by mesne assignments, to Allis-Chalmers Manufacturing Company, a Corporation of Delaware Application October 19, 1928. Serial No. 313,403

17 Claims. (Cl. 56—364)

This invention relates to a grain handling machine, and particularly to a device adapted to be used to raise grain after it has been cut. One form of the invention is applied to a combine. The entire machine is moved over a field upon which cut grain lies. The pick-up is operated and the grain is raised from the field and deposited in the carrier of the combine and moved from it into the machine where it is threshed and separated in the usual manner. One of the objects of the invention is, therefore, to provide means for picking up cut grain. Another object is to provide a pick-up attachment which may be detachably mounted on the combine and used to pick up the grain. When so used, the pick-up attachment is preferably driven from the power source which drives the mechanisms of the combine. Other objects will appear from time to time in the course of the specification and claims.

The invention is illustrated more or less diagrammatically in the accompanying drawings, wherein.

Like parts are designated by like characters throughout the specification and drawings.

Figure 1:
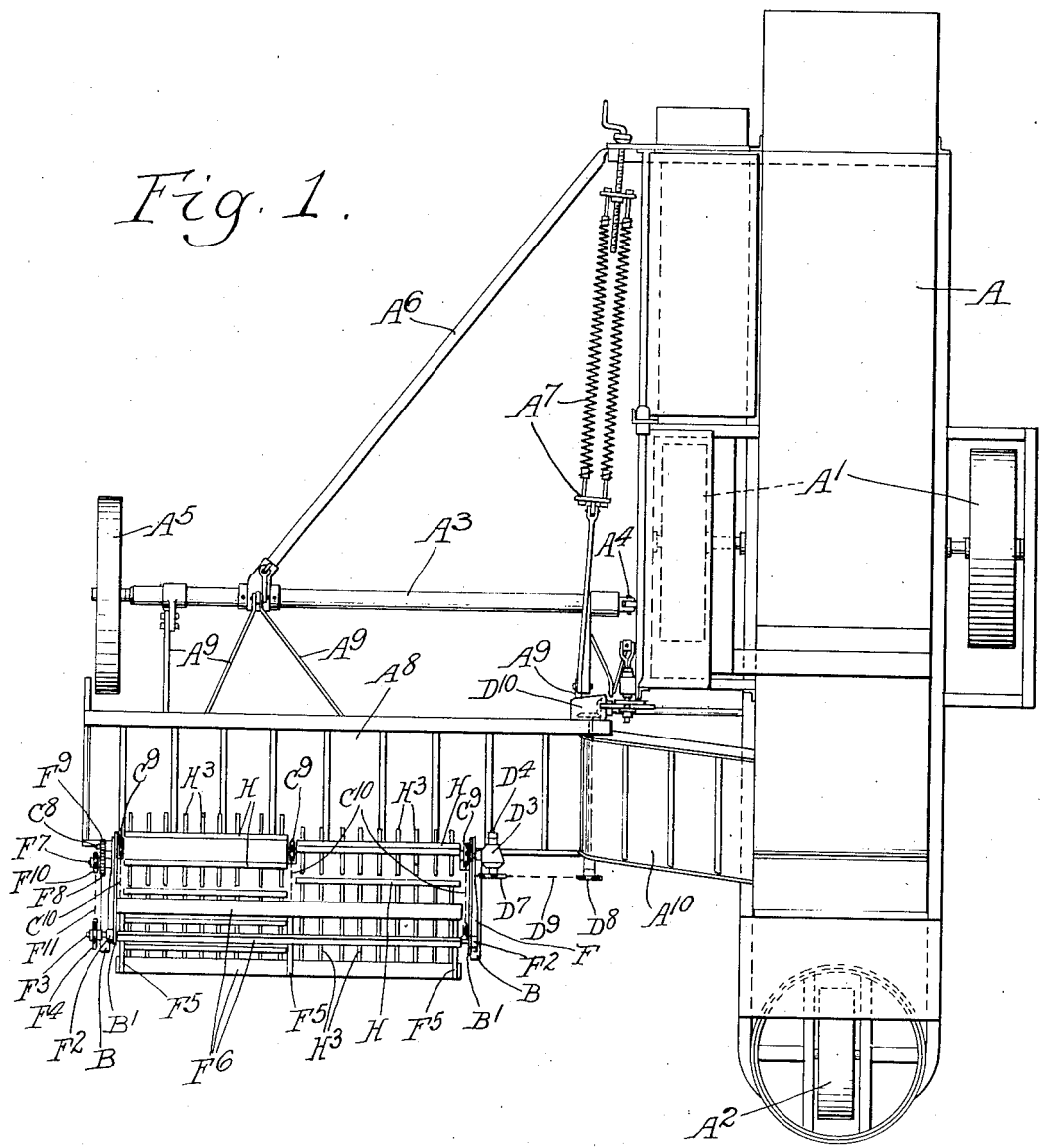
Figure 1 is a plan view of a combine with the pick-up attachment mounted upon it.
Figure 2:
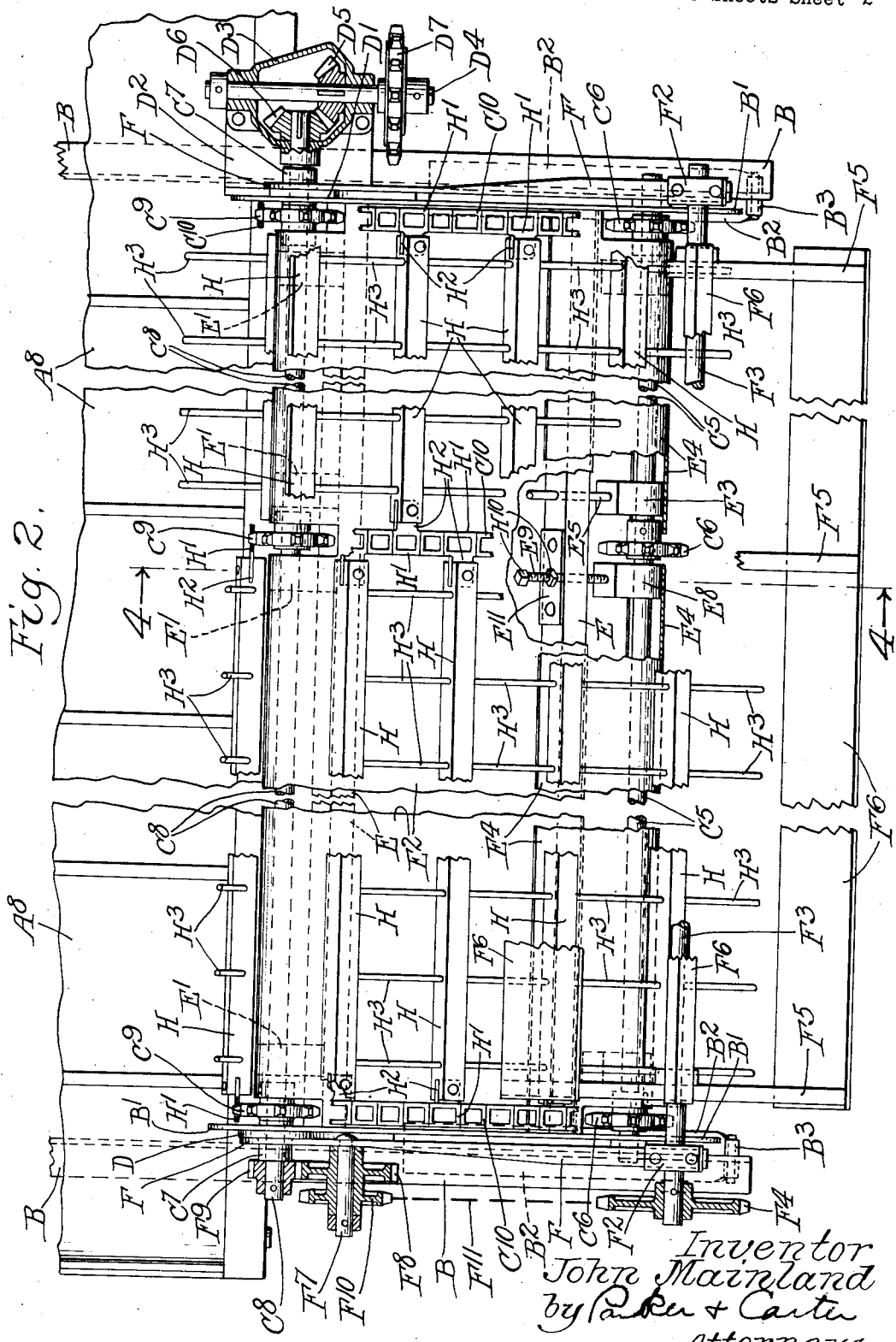
Figure 2 is a plan view of the pick-up attachment on an enlarged scale, with parts broken away and parts in section.

As shown in Figure 1, the main body of the combine is indicated at A. It is carried on wheels $A^1$, $A^1$. It is provided in its forward end with a steering wheel $A^2$. $A^3$ is a boom pivotally mounted on the combine frame at $A^4$, carrying in its outer end a supporting wheel $A^5$. $A^6$ is a brace for the boom. $A^7$ is a compensating supporting assembly which serves to balance and support the carrier $A^8$ which is supported from the boom by means of members $A^9$, $A^9$. $A^{10}$ is an elevator communicating with the carrier $A^8$ and by means of which grain which has been deposited on the carrier $A^8$ is moved laterally, is raised and deposited into the separator.

B, B are supporting arms adapted to be fastened to the frame work which carries the carrier $A^8$ and to carry the pick-up mechanism. The pick-up mechanism includes generally a continuous belt conveyor upon which slats and pick-up members are mounted. The conveyor is divided into two off-set sections which move together but provide means for spacing the slats and pick-up parts of one section alternately with those of another so that while the pick-up members of one section are in contact with the ground those of the adjoining section are not. $B^1$, $B^1$ are end plates mounted one at each end of the frame. These plates serve to support the mechanism of the pick-up assembly. $B^2$, $B^2$ are shoes, preferably spring shoes. Each of them is fastened to one of the arms B as at $B^3$ and provided with a ground contacting portion $B^4$ and an adjustable support $B^5$. This support is pivotally fastened to the portion $B^4$ at $B^6$ and provided with a plurality of perforations $B^7$ by means of which it may be adjustably positioned on the arm B to which its other end is attached. The end plates $B^1$, $B^1$ are slotted as at $B^8$. The adjustment of the member $B^5$ is to adjust the height of the pick-up assembly with relation to the ground.

C is a bearing housing. One of such housings is mounted in each of the frames $B^1$ and is provided with an opening $C^1$ within which is slidably mounted a bearing block $C^2$. An adjusting bolt $C^3$ is provided and carries upon it nuts $C^4$, $C^4$. By means of the bolt and nuts the bearing blocks $C^2$ may be raised and lowered. Journaled within the bearing blocks $C^2$, $C^2$ is the lower conveyor shaft $C^5$. This shaft carries a plurality of sprockets $C^6$. Journaled in suitable bearings $C^7$ adjacent the upper part of the plate $B^1$ is a second or upper conveyor shaft $C^8$. This shaft carries three sprockets $C^9$, $C^9$, one of which is positively placed with respect to each of the sprockets $C^6$. $C^{10}$, $C^{10}$ are link belts or chains of which there are three, one engaging each upper and lower pair of sprockets $C^6$, $C^9$. By means of this construction the upper and lower shafts rotate together.

D is a generally upright supporting member fastened to the member B. A generally similar member $D^1$ is mounted at the opposite end of the structure to the other member B. It is provided at its top with an enlargement $D^2$. The bearing blocks $C^7$, $C^7$ are supported in the members D, $D^1$ and may be formed integral with them. Since the upper shaft $C^8$ passes through the bearing members $C^7$ which are carried in the up-rights D, $D^1$, and since the side plates $B^1$, $B^1$ which carry the lower shaft $C^5$ are pivotally mounted about the center of the shaft $C^8$, the entire pick-up structure may rotate through a limited arc about the axis of the shaft $C^8$ supported by the end members D, $D^1$.

The upright member $D^1$ in its enlarged portion $D^2$ carries a gear housing $D^3$ within which is positioned a stub shaft $D^4$ which carries a bevel gear $D^5$ meshing with a second bevel $D^6$ which is mounted on the shaft $C^8$. $D^7$ is a sprocket mounted also on the shaft $D^4$ and lying outside of the gear housing $D^3$. $D^8$ is a sprocket connected with the sprocket $D^7$ by a chain $D^9$. Through suitable driving mechanism connected generally by $D^{10}$, the sprocket $D^8$ is driven preferably from the separator mechanism and thus the pick-up mechanism is driven.

E, E are supporting and stiffening members fastened to the side plates $B^1$, $B^1$ and extending laterally across the pick-up assembly. Fastened to the upper member E are a plurality of bearing blocks $E^1$, $E^1$. These blocks carry the upper shaft $C^8$. $E^2$ is a protecting cover or shell which is bent about the upper members $E^1$ and extends downward and is bent and fastened about the lower member E. $E^3$, $E^3$ are a plurality of bearing blocks supporting the lower shaft $C^5$. $E^4$ is a protecting hood or cover bent about the bearing blocks $E^3$ and overlying a part of the cover plate $E^2$ and resting upon the lower member E. Guiding bars or pins $E^5$ are positioned in perforations $E^6$ in the bearing blocks $E^3$. These guiding pins $E^5$ are slidably mounted in perforations $E^7$ in the lower member E. $E^8$ is a central bearing block supporting the lower shaft $C^5$. It is provided with an adjusting bolt $E^9$ which has upon it nuts $E^{10}$. The bolt $E^9$ passes through the lower member E and is threaded in a plate $E^{11}$ which is fastened to the lower member E.

F, F are side arms which support the reel in the manner to be described below. They are pivotally mounted on the outside of the bearing member $C^7$. $F^1$, $F^1$ are supporting stops which limit the lower pivotal movement of the arms F but permit them to rise upwardly. Adjacent the free ends of the members F each carries a bearing $F^2$. Within this bearing is journaled a shaft $F^3$ which carries at one end a sprocket $F^4$. Mounted on the shaft $F^3$ are a plurality of arms $F^5$ which carry and are connected by vanes $F^6$. $F^7$ is a stub shaft supported on one of the arms F and carrying a gear $F^8$ which meshes with the gear $F^9$ on the upper shaft $C^8$. $F^{10}$ is a sprocket mounted on the shaft $F^7$. $F^{11}$ is a chain connecting the sprockets $F^{10}$ and $F^4$. By means of the chain the sprocket $F^4$ and the shaft $F^3$ are driven from the upper shaft $C^8$.

G, G are upwardly extending supporting members mounted at their lower ends each upon one of the members B. $G^1$, $G^1$ are additional supporting and bracing members mounted each at its lower end upon one of the members B and joined at its upper end to one of the members G. The members G are provided at their upper ends with a laterally bent part $G^2$ within which is positioned an eye bolt $G^3$ which may be adjusted as to position by means of nuts $G^4$. $G^5$ is a spring fastened at its upper end in the ring $G^6$ of the eye bolt $G^3$. At its lower end as at $G^7$ each of the springs is fastened to the side members $B^1$ or to a part which is fastened to the side members $B^1$. Thus through the springs the pick-up attachment is mounted so that it may rise and fall through a limited pivotal movement. In passing over an obstacle the pick-up assembly may pivot upwardly. When the obstacle has been passed it will descend and it is supported by the springs. The arms which carry the reel may also pivot upwardly. When the entire assembly rises they rise with it since they are supported upon the side members $B^1$. The reel and its supporting arms however, may have a separate upward movement since the arms are merely supported in the members $F^1$ which limit the downward movement but do not prevent upward movement.

H, H are slats. As above mentioned each slat extends practically only about one-half of the width of the pick-up mechanism. The slats on one side are off-set with respect to those on the other. The slats of one set are, however, identical in construction with those of the other set. Each slat is mounted at its outer end to the outer sprocket chain $C^{10}$ and at its inner end to the inner sprocket chain $C^{10}$. The chains are provided with special links $H^1$ having laterally extending attaching parts $H^2$ to receive the slats. Mounted on each of the slats is a plurality of inclined fingers $H^3$.

It will be obvious that while I have shown and described an operative device, many changes might be made in the size, shape, number, relation and distribution of parts without departing materially from the spirit of my invention, and I wish therefore that my description and showing be considered as in a large measure diagrammatic.

Figure 3:
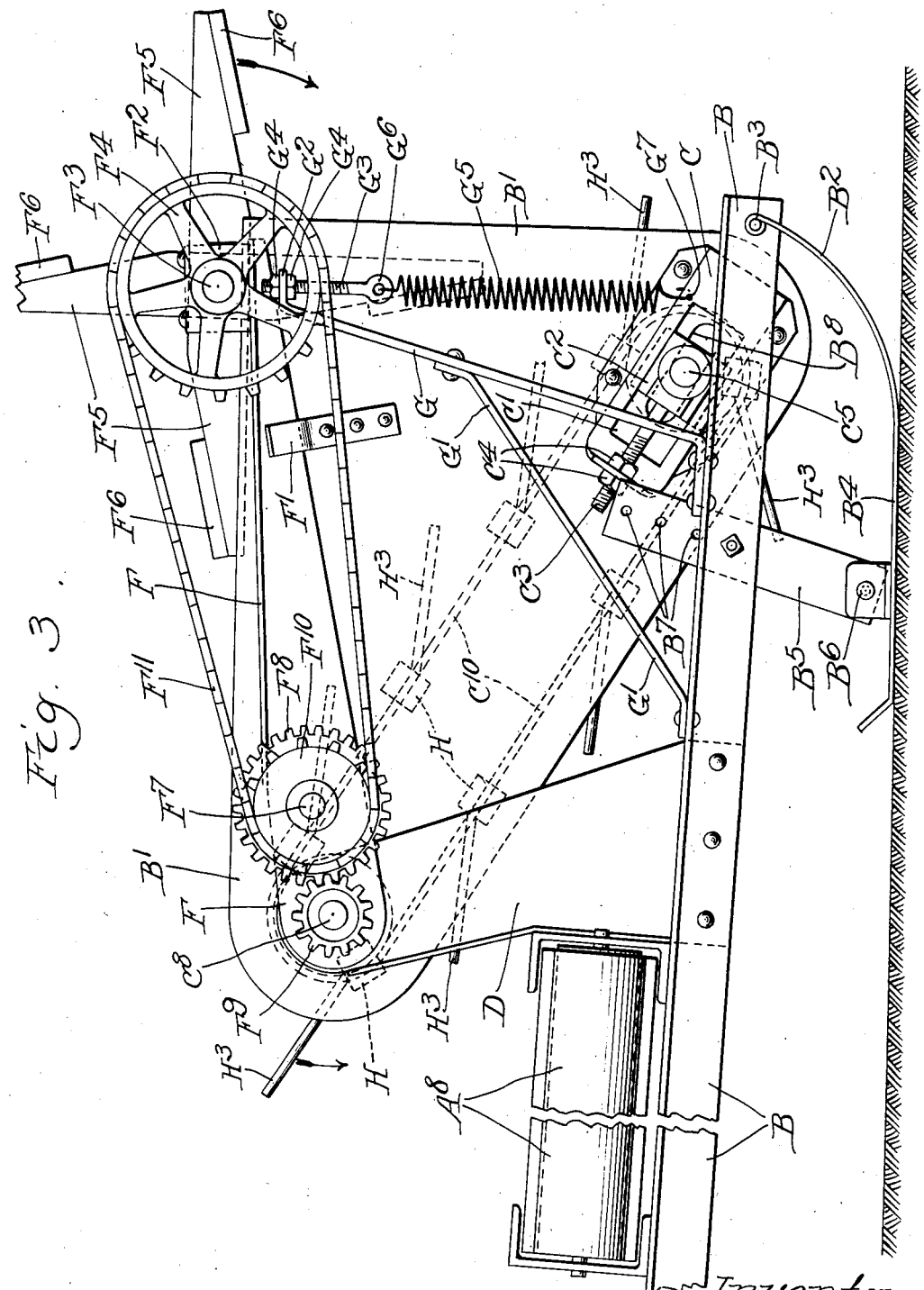
Figure 3 is a side elevation of the pick-up attachment in position on the combine.
Figure 4:
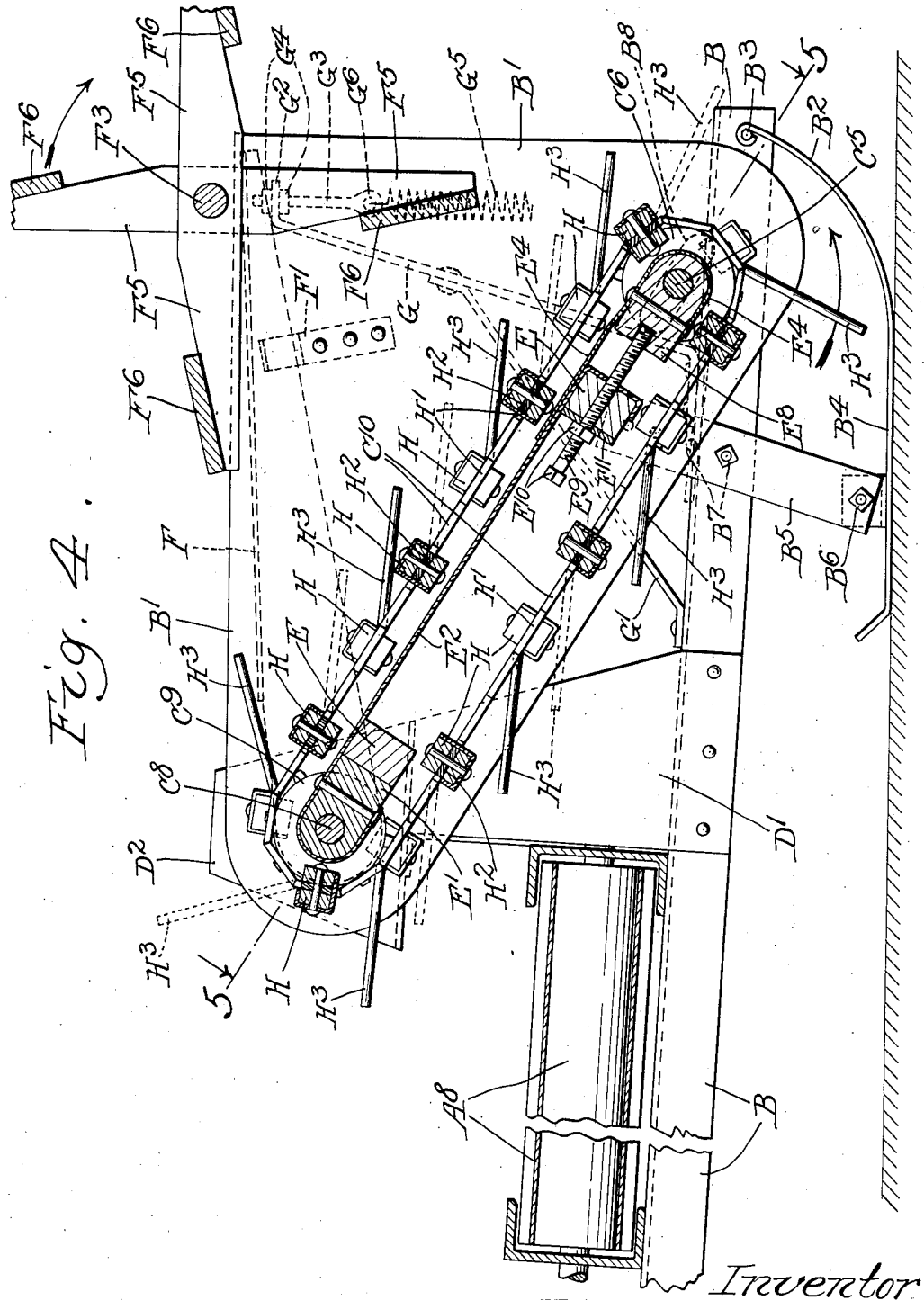
Figure 4 is a longitudinal, vertical cross section taken on line 4—4 of Figure 2.
Figure 5:
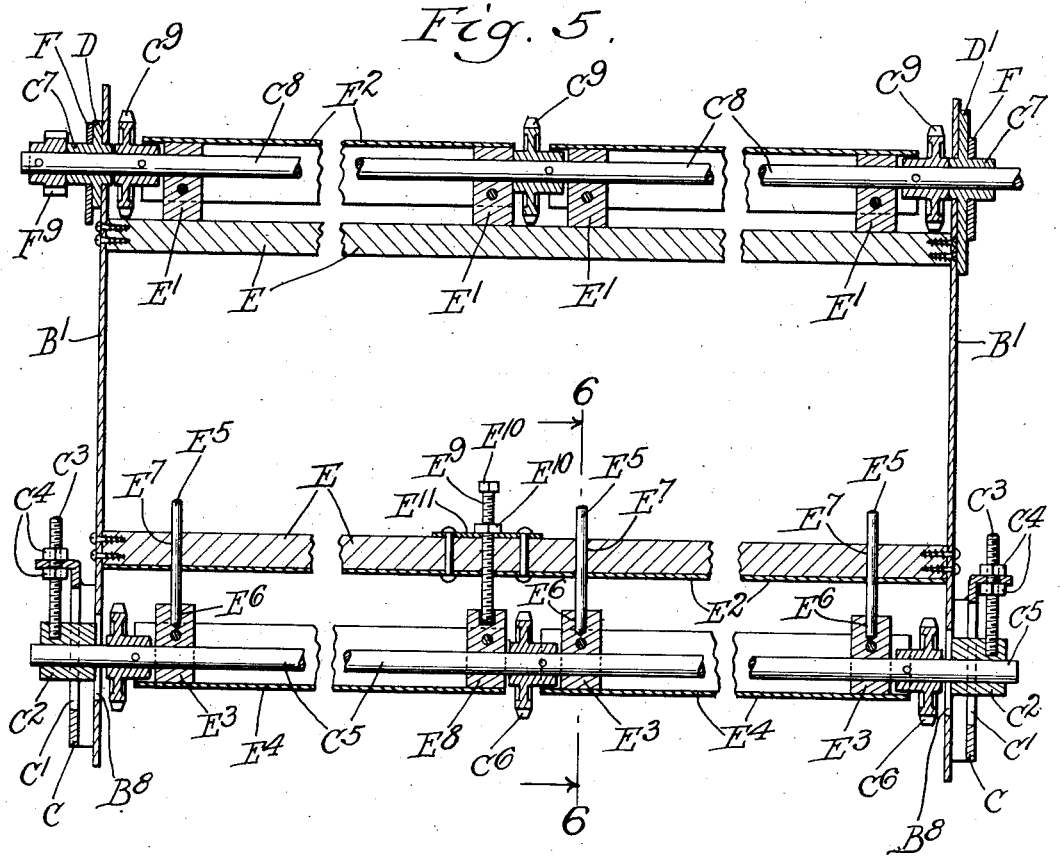
Figure 5 is a transverse cross section taken on line 5—5 of Figure 4.
Figure 6:
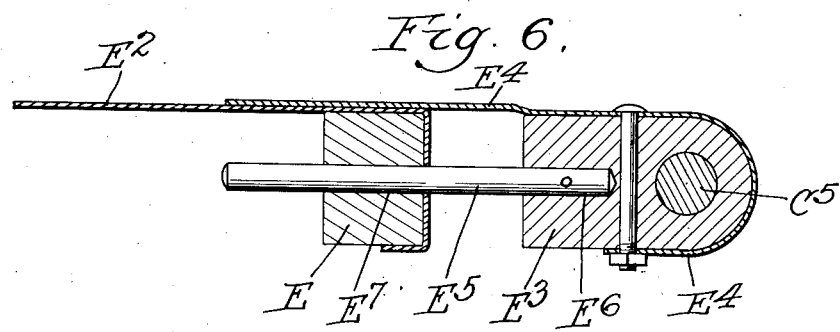
Figure 6 is a detailed cross section on an enlarged scale taken on line 6—6 of Figure 5.

The use and operation of this invention are as follows:

The pick-up assembly may be built integrally with the combine and may form a permanent part of it. It may also be used as a removable attachment for a combine. In the latter case, when it is desirable to use the pick-up, it is attached to a combine in the position shown in the drawings, particularly as shown in Figure 1. In that position it is mounted along the forward edge of the carrier and is connected with the driving mechanism which drives the carrier and the separating mechanism within the combine. It will be understood of course, that any form of drive might be used and the pick-up might be actuated separately. It is sufficient for the purposes of this invention that rotation be given to the rotary parts in the pick-up. When the pick-up mechanism is in the position shown, its position above the ground may be raised or lowered by adjustment of the eye bolts $G^3$. The belt will, of course, be tightened by adjustment of the bolts $C^3$ which adjust the lower shaft $C^5$ together with the general central adjusting bolt $E^9$. With the parts in the properly adjusted position and with the pick-up mechanism connected with a power source, the combine is moved across a field upon the surface of which grain is lying. The pick-up elevator rotates in the direction shown by the arrow in Figures 3 and 4 and the reel rotates in the opposite direction as indicated by an arrow in Figures 3 and 4. The pick-up fingers contact the grain on the surface of the field and raise it, and they, together with the slats, carry it backward and upward and deposit it upon the main carrying conveyor $A^8$. This is moved toward the separating part of the combine and the grain is carried thence to the elevator $A^{10}$ and into the separating zone. The reel, with the vanes $F^6$ serves to assist in keeping grain on the pick-up conveyor and it also somewhat assists the conveyor in carrying the grain backward.

The eye-bolt member $G^3$ may be adjusted up and down by means of nuts $G^4$, $G^4$. When it is adjusted upwardly to increase the tension on the helical spring $G^5$ the picking assembly will obviously rise more readily from the ground. This adjustment may be made to suit the conditions of operation.

As has been stated above, the pick-up may pivot upwardly about the center of the shaft $C^8$. This upward pivoting occurs when the pick-up strikes an obstacle, such, for example, as a stone upon the ground.

The upward movement of the reel is due to the volume of material passing under it. Since the material passes between the reel and the belt assembly of the pick-up, as a large volume of material enters, it will tend to cause the reel to pivot upwardly. This reel further tends to hold the grain in contact with the traveling conveyor of the pick-up during the time of pick-up movement. It thus serves as an important function of its operation also to prevent the material on the pick-up conveyor from being blown away. In practice it has been found that where the reel is not used, the tendency to blow grain off the conveyor is very pronounced in a high wind. With the reel this tendency is to a very large degree counteracted.

From the construction of the traveling conveyor of the pick-up, that is, the belt assembly which carries the slats H and the fingers $H^3$, it is clear that during the travel of the slats from sprocket to sprocket the fingers have a constant speed of movement. When, however, the belts of the pick-up move about either the forward or rear sprocket, the fingers swing outwardly, and they thus at these periods and in these positions have an increased peripheral velocity and their raking and pick-up action and their discharging action is greatly improved thereby.

I claim:

1. In a grain pick-up, a grain raising and conveying assembly, means for movably supporting said assembly upon a grain handling machine, and a second grain conveying member included as a part of said movably supported assembly, said member mounted for movement with respect to the rest of said pivotal assembly.

2. In a grain pick-up, a grain raising and conveying assembly, means for movably supporting said assembly upon a grain handling machine, and a second grain conveying member included as a part of said movably supported assembly, said member mounted for limited movement with respect to the rest of said pivotal assembly.

3. In a grain pick-up, a grain raising and conveying assembly, means for movably supporting said assembly upon a grain handling machine, and a second grain conveying member included as a part of said movably supported assembly, said member mounted for limited pivotal movement with respect to the rest of said pivotal assembly.

4. In a grain pick-up, a grain raising and conveying assembly, means for pivotally supporting said assembly upon a grain handling machine, and a second grain conveying member included as a part of said pivotally supported assembly, said member mounted for movement with respect to the rest of said pivotal assembly.

5. In a grain pick-up, a grain raising and conveying assembly, means for pivotally supporting said assembly upon a grain handling machine, and a second grain conveying member included as a part of said pivotally supported assembly, said member mounted for limited pivotal movement with respect to the rest of said pivotal assembly.

6. A pick-up attachment for grain handling machines adapted to be mounted thereon and including a movably mounted assembly, said assembly including a conveyor in combination with an additional conveying element for movement with it, and being itself, additionally carried on a separate assembly which may have movement relative to the main assembly, said grain conveyor provided with slats and grain contacting and raising elements.

7. A pick-up attachment for grain handling machines adapted to be mounted thereon and including a pivotally mounted assembly pivoted at one end and mounted for limited movement, said assembly including a conveyor in combination with an additional grain conveying element mounted on the assembly for movement with it, and being, itself additionally carried on a separate assembly which may have movement relative to the main assembly.

8. A pick-up attachment for grain handling machines adapted to be mounted thereon and including a pivotally mounted and spring balanced assembly, mounted for limited movement, said assembly including a conveyor in combination with an additional grain conveying element mounted on the assembly for movement with it, and being, itself, additionally carried on a separate assembly which may have movement relative to the main assembly.

9. A pick-up attachment for grain handling machines adapted to be mounted thereon and including a pivotally mounted assembly, said assembly including a conveyor provided with a plurality of sets of grain lifting and conveying elements, said sets off-set from each other, in combination with an additional grain conveying element mounted on the assembly for movement with it, and being itself additionally carried on a separate assembly which may have movement relative to the main assembly.

10. A pick-up attachment for grain handling machines adapted to be mounted thereon and including a pivotally mounted assembly, said assembly including a conveyor provided with a plurality of sets of grain lifting and conveying elements, said sets off-set from each other, in combination with an additional grain conveying element mounted on the assembly for movement with it, and being itself additionally carried on a separate assembly which may have movement relative to the main assembly, said grain conveyor provided with slats and grain contacting and raising elements.

11. A pick-up attachment for grain handling machines adapted to be mounted thereon and including a pivotally mounted and spring balanced assembly mounted for limited movement, said assembly including a rotary conveyor provided with a plurality of sets of grain lifting and conveying elements, said sets off-set from each other, in combination with an additional grain conveying element mounted on the pivotal assembly for movement with it, and being, itself, additionally carried on a separate pivotal assembly which may have movement relative to the main assembly.

12. A pick-up attachment for grain handling machines adapted to be mounted thereon and including a pivotally mounted and spring balanced assembly mounted for limited movement, said assembly including a rotary conveyor provided with a plurality of sets of grain lifting and conveying elements, said sets off-set from each other, in combination with an additional grain conveying element mounted on the pivotal assembly for movement with it, and being, itself, additionally carried on a separate pivotal assembly which may have movement relative to the main assembly, said grain conveyor provided with slats and grain contacting and raising elements.

13. A pick-up attachment for grain handling machines adapted to be removably mounted thereon and including a pivotally mounted assembly pivoted at one end and spring balanced at its other end, mounted for limited movement, said assembly including a rotary conveyor provided with a plurality of sets of grain lifting and conveying elements, said sets off-set from each other, in combination with an additional rotary grain conveying element mounted on the pivotal assembly for movement with it, and being itself additionally carried on a separate movable assembly which may have movement relative to the main assembly, said grain conveyor provided with slats and grain contacting and raising elements.

14. In a grain pick-up, a supporting element, a main grain carrying and pick-up element mounted on said supporting element and movable with respect thereto during normal operation of the apparatus, and means for retaining grain upon said carrying and pick-up element, said retaining means being movable with respect to said carrying and pick-up element during normal operation of the apparatus.

15. In a grain pick-up, a supporting element, a main grain carrying and pick-up element mounted on said supporting element and movable with respect thereto during normal operation of the apparatus, and means for retaining grain upon said carrying and pick-up element, said grain carrying and pick-up assembly being mounted to move during normal operation in response to contact of a portion thereof with the ground.

16. In a grain pick-up, a supporting element, a main grain carrying and pick-up element mounted on said supporting element and movable with respect thereto during normal operation of the apparatus, and means for retaining grain upon said carrying and pick-up element, said retaining means being movable with respect to said carrying and pick-up element during normal operation of the apparatus, said grain carrying and pick-up assembly being mounted to move during normal operation in response to contact of a portion thereof with the ground.

17. In a grain pick-up, a supporting element, a main grain carrying and pick-up element mounted on said supporting element and movable with respect thereto during normal operation of the apparatus, and means for retaining grain upon said carrying and pick-up element, said retaining means being movable with respect to said carrying and pick-up element during normal operation of the apparatus and comprising a plurality of spaced portions successively cooperative with said grain.

JOHN MAINLAND.